Aug. 26, 1969     L. R. YESKE ET AL     3,462,923

MOWER BREAKAWAY MECHANISM

Filed April 21, 1967     2 Sheets-Sheet 2

INVENTORS
LAUREL R. YESKE
JOHN G. CHRISTOPHER

United States Patent Office 3,462,923
Patented Aug. 26, 1969

3,462,923
MOWER BREAKAWAY MECHANISM
Laurel R. Yeske and John G. Christopher, Rockford, Ill., assignors to J. I. Case Company, Racine, Wis., a corporation of Wisconsin
Filed Apr. 21, 1967, Ser. No. 632,807
Int. Cl. A01d 75/18
U.S. Cl. 56—25  9 Claims

ABSTRACT OF THE DISCLOSURE

A releasable device for a cutterbar on a mower including a rigid member and a swingable member with an element pivotally connected to the members. A cushioned breakaway mechanism with latching means on the element engageable with the swingable member, the cushioned mechanism tending to resist swinging movement and including means for assisting in resetting of the mechanism.

BACKGROUND OF THE INVENTION

In the prior art, breakaway devices or mechanism have been incorporated into mowers which are either carried on or towed by a vehicle. Of course, in the days of horsedrawn mowers, a breakaway device was not considered so essential, as the forward speed of the mower and the sickle speed were not sufficiently fast to seriously damage the cutterbar mechanism if an obstruction was encountered. With the advent of higher ground speeds of the propelling vehicle, and also higher sickle speeds from the power take-off mechainsm, breakaway devices have become a required part of the mower to minimize serious damage to the cutterbar, and to the cutting mechanism and the means for driving it.

An example of a breakaway mechanism or break-back means is disclosed in Yeske No. 3,114,996 and assigned to applicant's assignee. Other mechanisms use telescoping members, arcuate guide tracks, releasable dragbars and the like as a releasable or safety device for the cutterbar. A different concept of such a mechanism is disclosed in Schaible et al., Patent No. 3,390,515. While these types have generally proven satisfactory, they lack the simplicity, reliability and other advantages of the present invention.

SUMMARY OF THE INVENTION

The present invention relates to mowers which may be front-mounted, side-mounted or rear-mounted on a tractor, or which may be the trail-type towed by the tractor. More particularly, the invention covers a breakaway or break-back or safety release mechanism which is attached to the mower. A mower, of course, is subject to extremely rough treatment over all kinds of terrain and especially is this true in cutting virgin fields or in mowing along highways where obstructions are not readily seen by the operator. It is therefore deemed necessary to have a breakaway mechanism which will cleanly break without being sluggish in operation, yet which will not break as a result of cutting into heavy crop growth or into slight obstructions. It is an advantage in having a breakaway mechanism which has a cushioned release so that these slight obstructions, not capable of damaging the mower, will not cause the mechanism to break back. It is also advantageous to have a mechanism which is easily resettable into the operating position. The invention includes an anchor on the frame of the mower, a supporting member pivotally connected to the mower dragbar, and a spring-loaded rod element connecting the anchor and the support member. The connecting rod element and its operative parts are positioned rearwardly of the dragbar.

The principal object of the present invention is to provide a breakaway mechanism for a cutterbar which cushions the cutterbar when in the operating position.

Another object is to provide a breakaway mechanism which clearly breaks when the cutterbar encounters an obstruction.

A further object is to provide a breakaway mechanism in which the cutterbar is easily moved from the breakaway to the operating position.

An additional object is to provide a breakaway mechanism which includes an assist means for returning the cutterbar from the breakaway to the operating position.

Still a further object is to provide a mechanism which includes means for manually releasing the latching means.

Still a further object is to provide a mechanism including adjusting means whereby the outer end of the cutterbar can be moved in a fore-and-aft direction.

And still a further object is to provide means for selecting the proper loading on the breakaway mechanism as required by varying mowing conditions.

Additional objects and advantages will become apparent from a reading of the description taken together with the annexed drawings, in which.

Figures 1, 4:
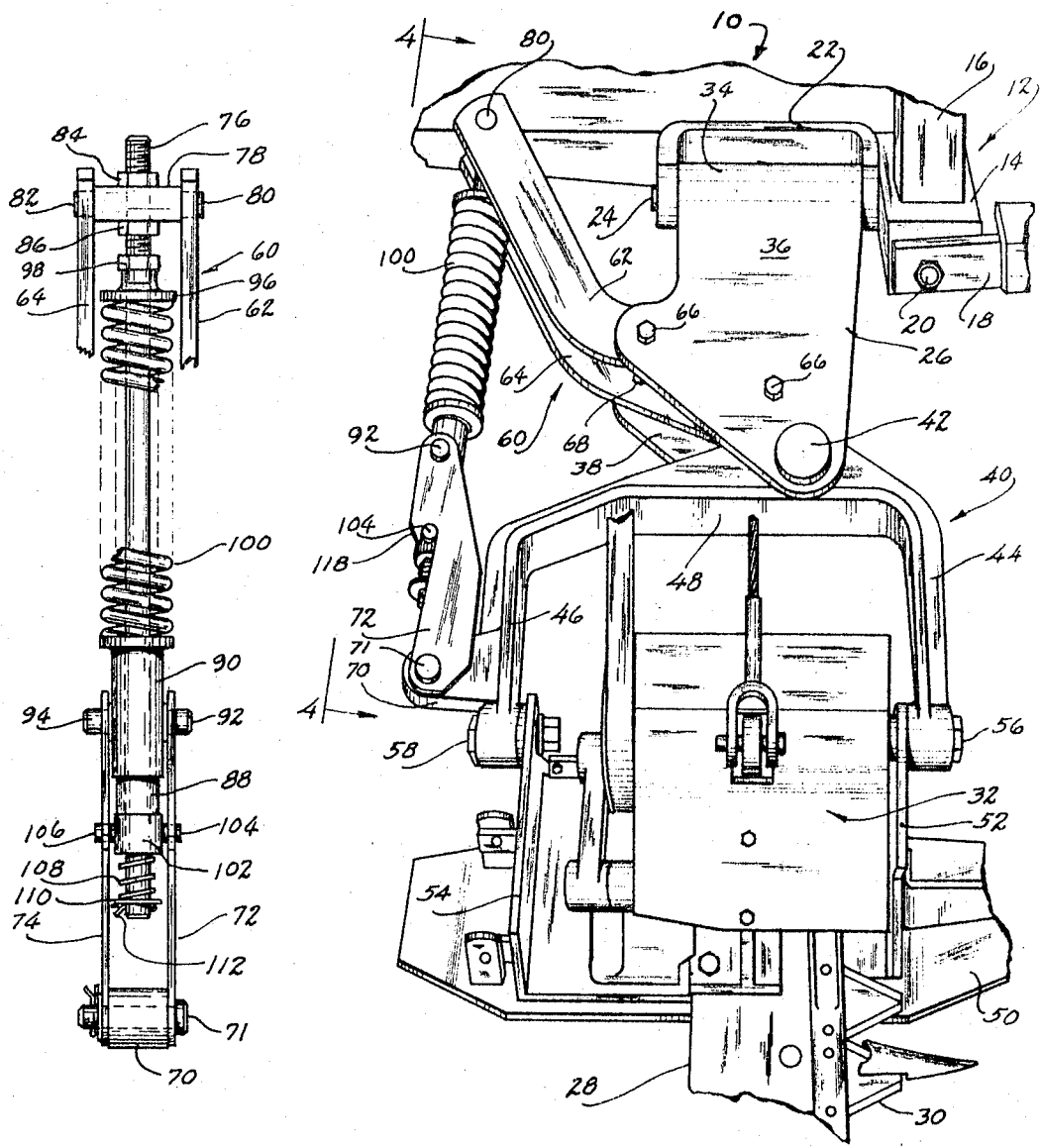
FIGURE 1 is a perspective top view of a portion of a mower incorporating the invention.
FIG. 4 is a detailed view of the various parts of the mechanism taken on line 4—4 of FIG. 1.
Figure 2:
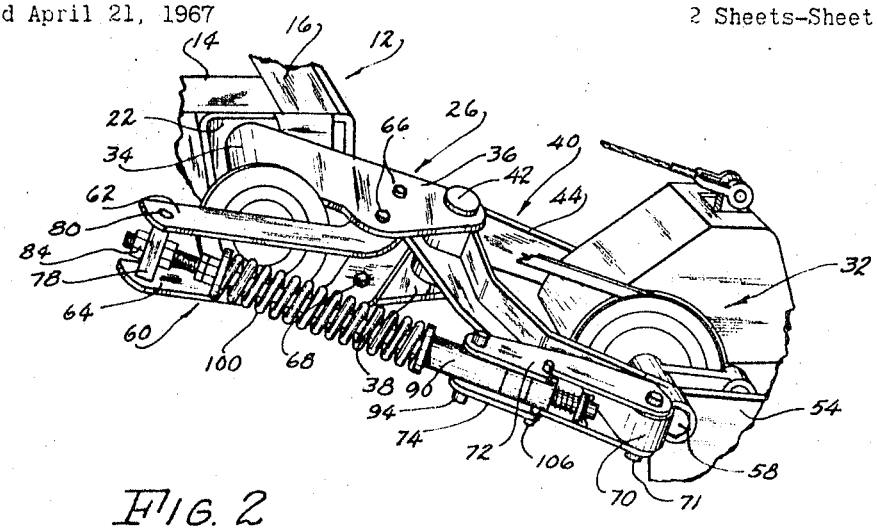
FIG. 2 is a perspective rear view showing the breakaway mechanism.
Figure 3:
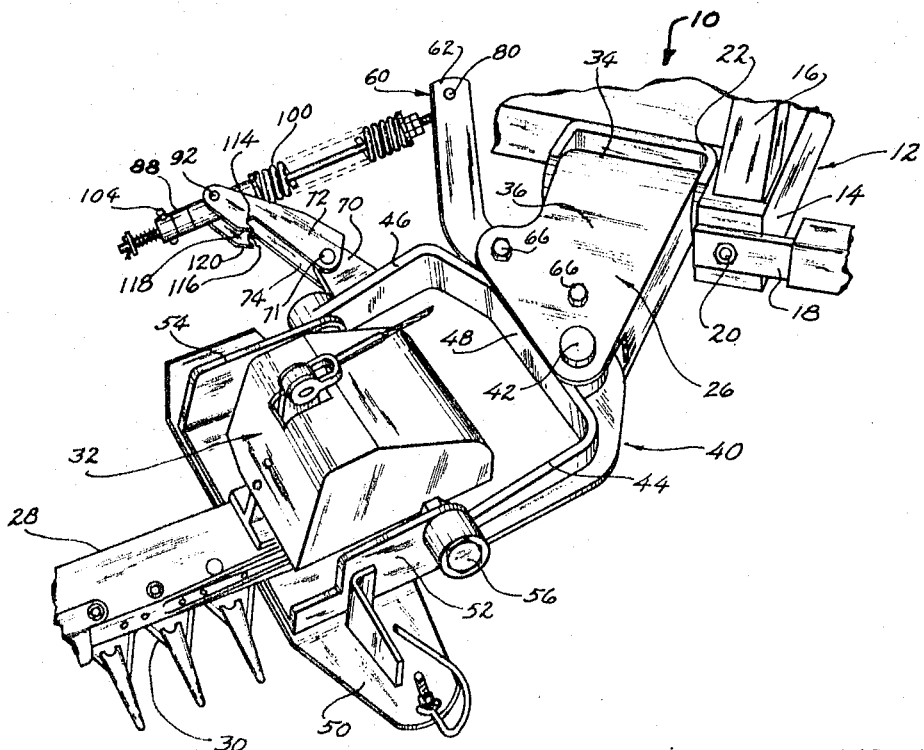
FIG. 3 is a perspective view showing the mechanism in break-back position.

As seen in FIGS. 1, 2, and 3, there is shown a portion of a mower generally designated as 10, the mower having a frame 12. Since the frame forms no part of the present invention except for attaching to a vehicle and for carrying the mower, a detailed description of the frame is not necessary. Frame 12 may be constructed and adapted for mounting on the rear, on the side, or on the front of a tractor, or it may be a part of a trail-type wheeled mower, the frame members and the drive for the mower being suitable for the particular type. Applicants have designed and constructed both a rear-mounted and a trail-type mower which incorporate the present invention; however, the breakaway mechanism on the mounted mower will be described in this application. Frame members 14 and 16 make up the forward part of the mower which is connected to the tractor. Member 14 is preferably a large channel piece which extends transversely across the rear of the tractor and the lower arms 18 of a three point hitch are pivotally connected as at 20 to member 14. Member 16 converges upwardly to a point near the centerline of the tractor and meets a like member extending upwardly from the other end of member 14. The upper hitch link is connected to the top of members 16 to complete the three point hitch, it being understood, of course, that the hitch is connected to the tractor as is generally known.

A slightly different view of the frame members is shown in FIG. 3 wherein a U-shaped member 22 is attached as by welding to member 14. Member 22, of course, may be additionally supported by other means to form a rigid connection with the frame.

Pivotally attached to member 22 by means of a pin 24 is a dragbar 26, member 22 carrying a cutterbar 28, a reciprocating sickle 30 and the drive mechanism 32 for the sickle. Since the drive mechanism forms no part of the present invention, it need not be further described except that it is constructed to reciprocate the sickle during normal operating conditions and position of the cutterbar and to stop reciprocation of the sickle when the cutterbar is in the breakaway position.

Dragbar 26 is preferably made up of a hub portion 34 and upper and lower plate portions 36 and 38 spaced from each other and rigidly connected to hub 34. Portions 36 and 38 are generally triangular shaped at the outer ends thereof for purposes to be described. A dragbar yoke, designated as 40 and which may be considered as part of or an extension of the dragbar 26, is pivotally connected by means of a pin 42. Yoke 40 has a forward leg 44 and a rearward leg 46 joined together by a bight portion 48. The inner shoe 50 of the cutterbar and the reciprocating sickle drive are carried by legs 44 and 46, shoe 50 having brackets 52 and 54 which are pivotally connected to legs 44 and 46 by pins 56 and 58.

It is thus seen in FIGS. 1, 2, and 3 that the cutterbar is pivotally connected to the dragbar yoke 40 such that the outer end of the bar is free to swing in an up-and-down direction, the yoke 40 is connected to the dragbar 26 such that the outer end of the cutterbar can swing freely in a fore-and-aft direction, and the dragbar is connected to the frame such that the cutterbar, inner shoe, reciprocating drive mechanism and the yoke and dragbar can be raised and lowered in respect to the ground.

In the normal operating position, the cutterbar extends generally at a right angle to the frame and to the direction of travel. Mechanism is provided to raise and lower the cutterbear in respect to the ground and also to raise and lower the outer end of the cutterbar when mowing on a slope. The outer end of the bar can also be raised a certain amount to avoid cutting through a gopher pile.

There are certain times as when mowing tall material that the operator cannot see an obstruction hidden in the crop. This obstruction may be a tree stump, a boulder, or the like and it is necessary to provide a breakaway mechanism to prevent damage to the cutterbar, the sickle, and the sickle drive. The present invention provides a simple and reliable breakaway mechanism for a mower and includes means for assisting the return of the cutterbar from the break-back to the operating position.

FIGS. 1, 2, and 3 show an anchor 60 constituting a pair of arms 62 and 64 attached to dragbar 26 by means of bolts 66 and 68, there being two bolts 66 connecting arm 62 to upper plate 36 and two bolts 68 connecting arm 64 to lower plate 38. Arms 62 and 64 are rigidly held by dragbar 26 and move only with the dragbar as it pivots on pin 24. The triangular-shaped dragbar thus provides structure for pivot pin 42 through the bight portion 48 of yoke 40. It also provides the structure for securing anchor 60 to the dragbar.

As best seen in FIG. 1, a bracket 70 is fixed to leg 46 of yoke 40, the bracket having a bore vertically inclined therethrough. The breakaway mechanism is disposed between and is connected to the anchor 60 and the bracket 70. Pivotally connected to bracket 70 is a supporting means including upper and lower support plates 72 and 74. These plates and the connecting element attached to the anchor are better seen in the detailed view seen in FIG. 4. The mechanism includes a partially threaded rod 76 pivotally connected to the anchor 60. A pivot block 78 separates arms 62 and 64, the block being in the form of a trunnion with pins 80 and 82 installed in bores in the arms 62 and 64. Block 78 has a threaded bore to receive rod 76 and nuts 84 and 86 are disposed on either side of block 78. These nuts, of course, secure the rod 76 in the block in a certain position and it is seen that the rod can be adjustably positioned by moving the nuts along the rod. The rod also includes a shoulder 88 fixed to the rod near one end thereof. Adjacent the shoulder 88 and slidable on the rod is a trunnion type sleeve 90 which is carried by support plates 72 and 74 by means of pins 92 and 94. A shoulder 96 and a nut 98 are on the threaded end of rod 76, the shoulder being slidable on the rod. A large compression spring 100 is a part of the breakaway device and surrounds rod 76 between shoulder 96 and sleeve 90. Spring 100 is therefore compressed between and seats on shoulder 96 and sleeve 90. Shoulder 88, and shoulder 96 with nut 98, function as a stop or containing means for spring 100.

Adjacent shoulder 88 is a trunnion 102 slidable on rod 76 and including pins 104 and 106. Adjacent trunnion 102 on rod 76 is a small spring 108 retained on the rod by a washer 110 and a cotter key 112. Support plates 72 and 74 define slots 114 and 116, shown in FIG. 3, on the rearward side of each plate and in a certain position of the rod 76 and trunnion 102, pins 104 and 106 engage in these slots. In the normal operating position, the pins 104 and 106 mate with slots 114 and 116 and the mechanism holds the cutterbar in this position. Plates 72 and 74 also include sloping edges or surfaces 118 and 120, also shown in FIG. 3, adjacent the slots, which edges will be further described.

In the operation of the breakaway mechanism, the cutterbar is initially in a position approximately at right angles to the direction of travel, and the sickle and drive mechanism are operating. Under normal cutting conditions, the breakaway is unaffected and pins 104 and 106 are seated in slots 114 and 116 to hold the cutterbar in position. As forces on the cutterbar build up due to heavy crop growth or rough terrain as when the cutterbar digs into small mounds of earth, the mechanism between pins 80–82 and 71 is in compression and since the cutterbar is pivoted around pin 42, yoke 40 tends to move in a clockwise direction, as seen in FIG. 1. As the forces increase, this clockwise movement, of course, applies also to bracket 70 and plates 72 and 74. Since trunnion sleeve 90 and the large spring 100 are slidable on the rod 76 against shoulder 96 secured by nut 98, this part of the assembly moves in the direction of pivot block 78. Trunnion 102, with pins 104 and 106, is retained by shoulder 88, which is fixed to rod 76, and the trunnion does not move with spring 100.

Therefore, as the torque on the cutterbar around pin 42 increases, the pins 104 and 106 unseat from slots 114 and 116. If the force is great enough the spring will be compressed sufficiently so that pins 104 and 106 escape from slots 114 and 116 and the breakaway mechanism will be actuated. It will be noted from FIG. 1 that pins 80, 92, and 71 are not on a straight line so that as soon as the pins slip from the slots, the trunnion sleeve 90 is free to swing on pins 92 and 94 and the mechanism breaks away and the cutterbar swings rearwardly. It is to be noted that the compression spring and the pins in the slots provide a cushioned breakaway by reason of unequal cutterbar forces so that the spring can be under varying compressing forces and the pins 104 and 106 are frequently sliding partially along in the slots 114 and 116. This cushioned action is especially important in heavy crop growth where the rearward forces on the cutterbar are greater than under normal conditions and the cutterbar can flex slightly without breakaway.

Another feature of the invention is in the location and function of small spring 108. Being slidable on the rod along with trunnion 104, a tool can be inserted between trunnion 104 and shoulder 88 and, by reason of shoulder 88 being fixed on rod 76, the trunnion with pins 104 and 106 can be moved in the direction toward washer 110, compressing the spring 108 and releasing pins 104 and 106 from their respective slots and the mechanism can be simply and manually operated without compressing the large spring 100. In similar fashion, as the cutterbar is rotated from the breakaway position to the operating position, the pins 104 and 106 engage the sloping edges 118 and 120 of plates 72 and 74 nearest pins 92 and 94. Further rotation of the cutterbar toward the operating position compresses spring 108 toward washer 110 and the pins slide along the sloping edges until they drop into the slots. It is seen that the trunnion 102, with pins 104 and 106, slides along the rod 76 against the pressure of spring 108 and the mechanism is reset without compressing the large spring 100.

Another feature of the invention is the function of the nuts 84, 86, and 98, in addition to being moved along rod 76 to provide for proper length between the pins 80-82 and pins 92-94 and setting the correct pre-compression in spring 100. If it is desired to put a slight lead or lag into the outer end of cutterbar 28, the nuts 84 and 86 can be turned on rod 76 and the distance between pins 80-82 and 92-95 can be either increased for a lead or decreased for a lag in the cutterbar.

It is thus seen that herein shown and described is a breakaway mechanism which accomplishes all the objects and advantages as set out above and includes many desirable features. While only one embodiment has been shown, variations on the above-described construction may occur to those skilled in the art, and it is to be understood that all such variations are contemplated as being within the scope of the invention.

What is claimed as new and desired to be secured by Letters Patent of the United States is:

1. A breakaway mechanism for a mower having a frame, a dragbar on the frame, a yoke pivotally connected to said dragbar for rearward swinging, and a cutterbar extending laterally from said yoke, said mechanism including
   anchor means secured to said dragbar and extending rearwardly therefrom,
   support means pivotally connected to said yoke,
   said support means defining a slot therein, a connecting element pivoted to said anchor means and to said support means for rearward swinging of said yoke and said support means in relation to said anchor means and said dragbar,
   stop means on said connecting element,
   yieldable means on said connecting element engageable with and contained by said stop means, and
   latch means slidable on said connecting element and movable into and out of said slot, said yieldable means being actuated under rearward forces on said cutterbar whereby an excessive rearward force compresses said yieldable means and moves said latch means out of said slot and said yoke and cutterbar swing rearwardly.

2. A mechanism in accordance with claim 1 wherein said anchor means includes a pair of arms and a pivot block separating said arms.

3. A mechanism in accordance with claim 1 wherein said connecting element is a pull rod threaded at one end thereof and adapted to be adjustably engaged with said anchor means.

4. A mechanism in accordance with claim 1 wherein one of said stop means is positioned on said element adjacent said latch means.

5. A mechanism in accordance with claim 1 including resilient means adjacent said latch means tending to retain said latch means in said slot.

6. A mechanism in accordance with claim 5 wherein said resilient means is slidable along the element for manually moving said latch means out of said slot.

7. A mechanism in accordance with claim 1 wherein said support means defines an inclined surface contactable by said latch means, said surface guiding said latch means for re-entry of said latch means into said slot as said cutterbar is moved from the breakaway to the operating position.

8. A mechanism in accordance with claim 1 wherein said support means includes a pair of plates pivoted on said yoke, said plates defining slots therein for seating of said latch means.

9. A mechanism in accordance with claim 3 wherein said connecting element includes jam-nuts on said pull rod adjustable for displacing the outer end of said cutterbar in a fore-and-aft direction in relation to said dragbar.

References Cited

UNITED STATES PATENTS

| 2,520,743 | 8/1950 | Tanke | 56—25 |
| 2,555,541 | 6/1951 | Hilblom | 56—25 X |
| 3,114,996 | 12/1963 | Yeske | 56—25 |
| 3,313,094 | 4/1967 | Wathen | 56—25 |
| 3,390,515 | 7/1968 | Schaible et al. | 56—25 |

ROBERT PESHOCK, Primary Examiner

P. A. RAZZANO, Assistant Examiner